United States Patent

Danielson et al.

[11] Patent Number: 6,059,528
[45] Date of Patent: May 9, 2000

[54] ELECTRONIC PROPELLER CONTROL SYSTEM

[75] Inventors: David Danielson; Charles DeGeorge, both of Suffield, Conn.; Paul Carvalho, Westfield, Mass.

[73] Assignee: United Technologies Corporation, Hartford, Conn.

[21] Appl. No.: 09/244,376

[22] Filed: Feb. 4, 1999

Related U.S. Application Data

[63] Continuation of application No. 08/753,229, Nov. 22, 1996, Pat. No. 5,897,293.

[51] Int. Cl.[7] .................................................. B63H 3/08
[52] U.S. Cl. ............................... 416/46; 416/43; 416/44; 416/47; 416/49; 416/61; 416/153
[58] Field of Search .................................. 416/43, 44, 47, 416/49, 61, 153

[56] References Cited

U.S. PATENT DOCUMENTS

| | | | |
|---|---|---|---|
| 2,980,188 | 4/1961 | Allen, Jr. et al. | 416/46 |
| 3,004,608 | 10/1961 | Pond | 416/47 |
| 3,973,873 | 8/1976 | Shank | 416/43 |
| 5,037,271 | 8/1991 | Duchesneau et al. | 416/47 |
| 5,174,718 | 12/1992 | Lampeter et al. | 416/48 |

*Primary Examiner*—Edward K. Look
*Assistant Examiner*—Ninh Nguyen
*Attorney, Agent, or Firm*—Cantor Colburn LLP

[57] ABSTRACT

An improved electronic hydraulic propeller control designed as a retro-fit kit for existing Hamilton Standard Division 54460 and 54H60 propeller controllers includes an apparatus for controlling the pitch angle of a propeller blade. The retro-fit kit includes an electro-hydraulic servo valve, an electronic controller, a protection valve, and a propeller maintenance interface panel. These components functionally replace the existing hydromechanical propeller control system without reconfiguration of the existing interface. The apparatus converts mechanical inputs of the propeller and airframe systems to electronic signals, which can be measured by the electronic control. The apparatus also receives and converts the electronic control's commands into hydraulic pressure and flow changes through an electro-hydraulic servo valve. The electronic controller performs the required calculations to interpret and then react to changes in the propeller/airframe systems. The electronic controller has two channels in a master/slave configuration to provide back up control of 90% of all functionality. Back-up systems are implemented through a protection valve, which can override hydraulic inputs from the electro-hydraulic servo valve. The propeller maintenance interface panel provides a link between the aircraft personnel and the propeller system to allow for calibration, fault interrogation, and real time data display.

24 Claims, 1 Drawing Sheet

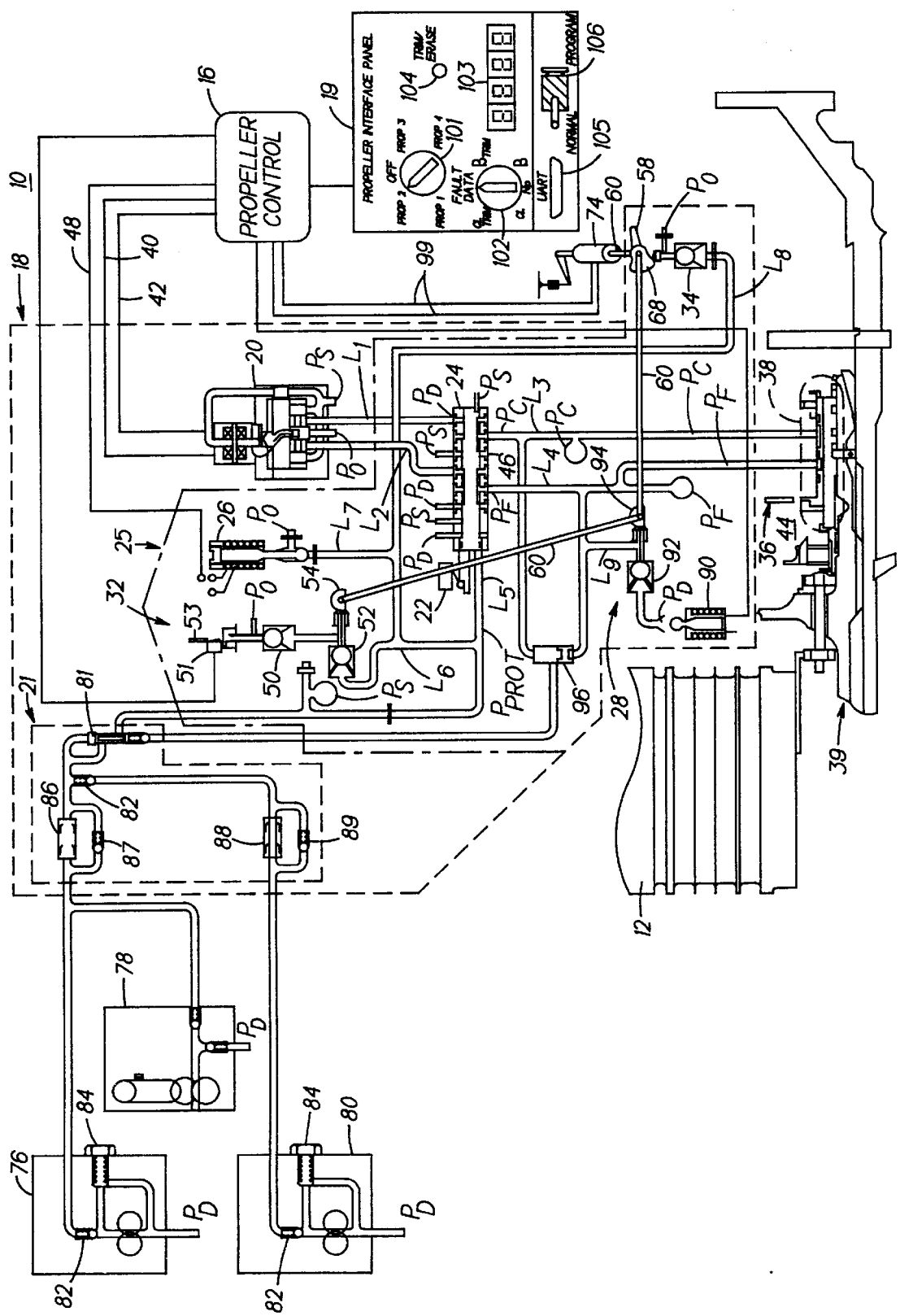

ELECTRONIC PROPELLER CONTROL SYSTEM

CROSS REFERENCE TO RELATED APPLICATIONS

This is a continuing application in part of a U.S. patent application Ser. No. 08/753,229, filed on Nov. 22, 1996, and now U.S. Pat. No. 5,897,293, entitled "Counterweighted Propeller Control System" which is herein incorporated by reference.

TECHNICAL FIELD

This invention is directed to propellers, and more particularly, to an electronic control system with a backup system for controlling and monitoring propeller blade functions, and specifically blade angle changes.

BACKGROUND OF THE INVENTION

Variable pitch propeller systems incorporate mechanisms to protect the systems against uncommanded blade angle excursions towards low pitch or low blade angle, typically in the event of hydraulic failure. Propeller designs which use pitch lock systems also allow for the use of a simple pitch change actuator. Accordingly, hydraulic pressure required to adjust propeller blade pitch or angle may be supplied directly to the coarse pitch and fine pitch chambers of the pitch change actuator usually found in such systems, on command from a propeller control. Many propeller systems, are controlled via a hydromechanical system. These systems typically include a flyweight governor, a differential gear set for blade angle feedback, and numerous hydraulic valves, cams, and levers.

An electronic control system is typically operable to control and monitor blade angle thereby changing blade angle as demanded by flight conditions. In the typical case, such commands are implemented by an electronically operated valve which directs and cuts off hydraulic fluid to the coarse and fine pitch chambers of the pitch change actuator.

In the event that there is an electronic failure within the propeller control system or loss of aircraft electrical power, a backup system must be deployed, which system is typically mechanical, and will adjust or maintain the blade angle in accordance with flight conditions. In this manner, electronic malfunctions, which could cause blade angle to send the propeller into overspeed conditions and high negative thrust can be avoided.

In currently available mechanical propeller control systems, with mechanical backups, the overall system size and complexity can be problematic with regard to important weight and cost, and reliability considerations.

There exists a need, therefore, for an electronic propeller control system with a mechanical backup, which is reliable and provides due consideration to weight and complexity for increasing flight efficiency and decreased costs, respectively.

SUMMARY OF THE INVENTION

The primary object of this invention is to provide an improved retrofit propeller control system having an electronic controller with a simplified mechanical backup system for monitoring, controlling and changing the propeller blade angle.

Another object of this invention is to provide an electronic propeller control system with a backup system for use with pitch lock type propeller blades wherein the system includes a single simplified protection valve which is operative to control various backup system features.

Still another object of this invention is to provide an electronic propeller control system having a backup system incorporated in a lighter and lower cost hydromechanical unit.

And yet another object of this invention is to provide an electronic propeller control system having a backup system, wherein the control system includes means for automatically checking the functionality of the mechanical system.

The objects and advantages set forth herein are achieved by the system of the present invention for controlling the blade angle of a plurality of blades of a propeller. The system includes an actuator for adjusting the blade angle of the plurality of blades in response to hydraulic pressure. A servo valve is disposed in selective fluid communication with the actuator. The servo valve provides hydraulic pressure to the actuator in response to a control signal. The system further includes an electronic control that provides the control signal to actuate the servo valve in response to a plurality of input signals. A protection valve is disposed in fluid communication with and intermediate the servo valve and the actuator. The protection valve selectively provides fluid communication between the servo valve and the actuator in response to a protect pressure. A backup device is disposed in fluid communication with said protection valve, said backup device providing a protect pressure to actuate the protection valve in response to a predetermined condition.

BRIEF DESCRIPTION OF THE DRAWINGS

The only FIGURE is a schematic view of an electronic propeller control system of the present invention, including an electronic valve housing, an electronic propeller control, a protection valve, and a propeller maintenance interface panel.

DETAILED DESCRIPTION OF THE INVENTION

Referring now to the FIGURE, a schematic view of an electric/hydraulic propeller control system, designated generally as 10, for an aircraft embodying the present invention is shown. The propeller control system 10 monitors and changes blade pitch angles of propeller blades 12, mounted as known in the art, to a propeller hub (not shown). The control system 10 generally includes an electronic propeller control 16, an electronic valve housing 18, and a propeller maintenance interface panel 19 that replace or retrofit existing Hamilton Standard Division 54460 and 54H60 propeller controllers without major reconfiguration of the interfaces. The valve housing 18 directly replaces the existing hydromechanical valve housing assembly of the 54460 and the 54H60 Integral Oil Control units.

The valve housing 18 converts mechanical inputs of the propeller and airframe systems to electronic signals, which can be measured by the propeller control 16. These inputs include control lever position, propeller blade angle and low engine torque. The valve housing 18 also receives and converts the commands from the propeller control 16 into hydraulic pressure and flow changes via an electro-hydraulic servo valve 20. These pressure and flow changes in turn change the blade angle of the propeller. The propeller control 16 is an electronic computer, which performs the required calculations to interpret and then react to changes in the propeller/airframe systems. The propeller control 16 has two channels in a master/slave configuration to provide back up control of 90% of all functionality. The interface panel 19 provides a link between the aircraft personnel and the propeller control system 10 to allow for calibration, fault interrogation, and real time data display.

Hydraulic pressure, for actuating the various mechanisms disclosed herein, is indicated generally in the FIGURE by the tubular lines and is designated more specifically in the FIGURE and throughout the text by the $P_{SUBSCRIPT}$ designations, wherein $P_S$ is supply pressure, $P_C$ is coarse pitch pressure, $P_F$ is fine pitch pressure, $P_O$ is ambient sump pressure, $P_D$ is drain pressure, and $P_{PROT}$ is protection pressure.

Valve housing 18 includes an existing filtering system 21 of the control system 10 of the current hydro-mechanical control systems on the 54×60 propellers. Once filtering system 21 regulates and filters the supply pressure, the supply pressure is provided to the rest of the control system. Valve housing 18 also includes the servo valve 20, used by the propeller control 16, a protection valve 24 also used in part by the propeller control 16, a mechanical backup system 25 (as indicated by the dotted line box), including protection valve 24, a feather solenoid 26, a low pitch retardation system 28, a feather latch retract solenoid 30, a negative torque sensor system 32, and a mechanical feather valve 34. A beta angle feedback sensing system 36, pitch change actuator (not shown), and oil transfer interface 38 are also provided. Additional elements are included in both the electronic and hydromechanical system portions, which elements are discussed in detail below.

Electronic control systems, such as propeller control 16, have been implemented as control systems for achieving more accurate control over blade angle monitoring, control and change. Accordingly, propeller control 16 functions with servo valve 20, through protection valve 24 for controlling the metering of hydraulic fluid $P_F$ and $P_C$ to and from the pitch actuator 39 for both fine, i.e. low pitch, and coarse, i.e. high pitch, control and adjustment of the pitch angle of propeller blades 12. Preferably, electronic propeller control 16 is a dual channel microprocessor based unit, having a primary channel and a backup channel, which provides closed loop control of the pitch of propeller blades 12. The propeller control 16 functions to control speed governing, synchrophasing, beta control, feathering and unfeathering, inhibit/enable negative torque, inhibit/enable low pitch stop retract, pitch lock reset, fault detection, built in test, and fault isolation. In addition to these functions, propeller control 16 detects, isolates and accommodates control system faults. An example of a controller, which may be used in propeller control 16 for achieving the aforementioned functions, is EPC 100-1, manufactured by Hamilton Standard, a division of United Technologies Corporation, the assignee of the present invention. Propeller control 16 is preferably programmed in a known manner to perform the functions as set forth above. Propeller control 16 is connected and in communication with servo valve 20. Accordingly, propeller control 16 is operational to send electronic signals to servo valve 20 for initiating and maintaining hydraulic fluid metering for operating the pitch actuator, as known in the art.

Propeller control 16 also controls propeller RPM wherein a governing RPM is selected from one of multiple predetermined values stored in memory provided in propeller control 16. Propeller control 16 will compare sensed propeller RPM to the selected governing RPM and to correct any diversion from the governing RPM, propeller control 16 will calculate and invoke a pitch change in blades 12 by way of the electro-hydraulic servo valve 20. Accordingly, when multiple propellers of a multiple propeller aircraft have stabilized at a selected governing RPM, synchrophaser control is initiated. A propeller control 16 is provided for each of the propellers in the multi propeller system and in accordance with known means, a master and slave arrangement is provided for controlling RPM differentials between the propellers. That is, small changes will be made to the reference speed of the slave propeller, whichever is selected, to achieve a constant phase relationship with the master propeller.

Electronic propeller control 16 is designed to automatically compensate for any single or any combination of faults that may be experienced thereby. Accordingly, a pilot will be advised of a fault that occurs in propeller control 16 via signals controlled by propeller control 16. Any combination of faults that would disable both channels of control 16 are partially accommodated by backup system 25; specifically a negative torque sensor system 32, a mechanical feather valve 34, a feather solenoid 26 and a low pitch stop retardation system 28. Accordingly, the safe completion of flight is allowed regardless of the faults. Fault accommodation by control 16 includes the automatic transfer of control to the backup channel 40 thereof if certain faults are detected by the primary channel 42 here of or in of any of the electromechanical device control interfaces. The accommodations further includes the automatic re-initialization of a primary channel 42 when confrontational faults are detected, and restoration of control by the primary channel 42 when health is restored. And finally, accommodation includes the automatic reversion to alternate control modes when signals required for operation in normal control modes are not available to either channels 40, 42.

Propeller control 16 also has the ability to perform its own test on low pitch retardation system 28 prior to flight by finely adjusting blade angle until the low pitch stop is activated. By receiving feedback from feedback system 36 as to blade angle at the time of activation of low pitch retardation system 28, propeller control 16 can determine if the low pitch stop system is activating at the proper blade angle.

Servo valve 20 is a dual coil device which accepts a pulse width modulated command through channel 40 or channel 42 from the propeller control 16 on either of two channel windings allowing for a dual channel control system. Servo valve 20 is preferably in the form of an electro-hydraulic, four-way jet pipe, servo valve, as known in the art, that controls blade pitch rate by metering hydraulic flow to a pitch actuator 39. The flow of hydraulic pressure $P_F$, $P_C$ supplied via electro-hydraulic servo valve 20 is proportional to a milli-amp electrical signal received from propeller control 16 over at least one of its two independent electrical channels 40, 42, after propeller control 16 has communicated with the other aircraft systems to determine the appropriate blade angle of the propeller. Servo valve 20 has two independent electrical channels for communication with the two electrical channels of propeller control 16. The incoming supply pressure is directed towards one side of the servo valve which subsequently increases oil flow in the $P_F$ or $P_C$ propeller supply lines for propeller actuator piston movement.

An example of feedback that propeller control 16 receives from other aircraft systems is the propeller speed feedback provided by sensors 44, positioned near blades 12 for providing blade speed data. In one embodiment there are three pickups for each rotating propeller, two redundant sensors 44 for propeller speed and beta range operation and a third sensor 44 for synchrophasing control. Sensors 44 are preferably in the form of magnetic pickups although other sensing devices may be utilized. The pickups are adapted to be placed behind blades 12 within the valve housing 18 for sensing and providing propeller speed to each channel of electronic propeller control 16. Also, a single coil pickup provides a remote propeller speed signal to the primary channel of control 16, to facilitate synchrophasing.

As indicated, protection valve 24 is associated with valve housing 18. In a normal mode, the protection valve 24 is operable to direct hydraulic fluid pressure $P_F$, $P_C$ from servo valve 20 to oil transfer interface 38 for use with the pitch actuator 39 for adjusting blade angle. However, when triggered, the protection valve 24 can cut off the flow from the servo valve 20 and directly pass supply pressure ($P_S$) to the high pitch side ($P_C$) of the propeller actuator 39 while simultaneously connecting the low pitch side ($P_F$) the propeller actuator to pressurized sump pressure ($P_D$).

Once the servo valve 20 has shifted flow into one of the two control lines, $L_1$ or $L_2$, these control lines pass through the protection valve 24 to control lines $L_3$ or $L_4$, respectively. Protection valve 24 is preferably in the form of a spool valve, as known in the art, although other types of valves may be utilized, having a plurality of channels 46 through which hydraulic pressure is ported. Hydraulic fluid flows from electro-hydraulic valve 20 of electronic control 16 through protection valve 24. Protection valve 24 allows system 25 to backup electronic propeller control 16 by allowing the same to assume pitch change control authority from propeller control 16, and servo valve 20, after the occurrence of an electronic malfunction, or other condition such as a testing routine or manual override. In addition, there is a proximity switch 22 on the protection valve 24 wired to the propeller control 16 which provides a signal indicative of the movement of the protection valve 24 out of its normal position.

As indicated in the FIGURE, coarse pitch hydraulic pressure $P_C$ originates from servo valve 20 in line $L_1$ and continues in line $L_3$ to oil transfer interface 38 for use in controlling the pitch angle of blades 12 toward high pitch. Also, fine pitch hydraulic pressure $P_F$ flows through line $L_2$ through protection valve 24, and continues in line $L_4$ to oil transfer interface 38, as shown in the FIGURE, for controlling the pitch angle of the blades toward low pitch. Accordingly, in the electronic mode, protection valve 24 is aligned with electro-hydraulic servo valve 20 for allowing hydraulic fluid flow through lines $L_1/L_3$ and $L_2/L_4$ for coarse and fine blade pitch angle adjustment, respectively, as commanded by propeller control 16.

In the event that propeller control 16 fails, is manually overridden, or a testing routine is implemented, protection valve 24 is operative to reposition to a protection position and cut off flow pressure $P_F$, $P_C$ as supplied from servo valve 20 and through lines $L_1$ and $L_2$. That is, hydraulic pressure $P_{PROT}$ is drained from protection valve 24 through a combination of lines $L_5$, $L_6$, $L_7$, and $L_8$ of the system 25 for invoking a protection valve 24 shift. In general, as protection valve 24 is actuated for placing one of the backup devices in command, supply hydraulic pressure $P_S$ is connected with line $L_3$ for providing pressure $P_C$ to the coarse (high) side of actuator 39 and the fine (low) pitch side $L_4$ of the actuator is ported to drain. Actuation of the blades 12 to a coarser pitch is thereby achieved.

Feather solenoid 26 is one of the backup devices of propeller control system 10. The feather solenoid 26 is energizable by an electric signal from a discrete source, preferably a manual override switch (not shown), for draining hydraulic pressure $P_{PROT}$ from the metered pressure side of protection valve 24, to rapidly command blade angle to the feather position. Typically, feathering is accomplished through electronic propeller control 16 via a discrete input. However, if propeller control 16 malfunctions, a pilot can override it and feather can be independently accomplished through feather solenoid 26. In this manner, metered pressure $P_{PROT}$ from line $L_7$ is rapidly ported or drained from protection valve 24 as hydraulic pressure $P_O$ causing protection valve 24 to shuttle left to the fully protected position. Full supply pressure $P_S$ is then applied from protection valve 24 as pressure $P_C$ through line $L_3$ to the coarse pitch side of actuator, and the fine pitch side is ported to drain through line $L_4$, resulting in a blade angle slew rate toward feather.

The propeller control 16 may override the feather solenoid to prevent actuation of the feather solenoid 26 by the pilot. A terminal of the feather solenoid is connected to propeller control 16 via lead 48. To enable the feather solenoid 26, the propeller control 16 grounds lead 48 to provide a current path when the discrete source provides an electrical signal to the feather solenoid. To disable the feather solenoid 26, the propeller control 16 opens or provides a high impedance at lead 48.

Another such backup device is the negative torque system 32. The negative torque system 32 includes a negative torque valve 50, a disarm valve 52 and a proximity switch 51 that protect against low/negative engine torque, which can result in dangerously high drag on one side of the aircraft in the event of an engine failure. When the aircraft reduction gear box (not shown) is in a low or negative torque condition, a plunger 53 actuates the proximity switch 51 to provide a signal to the propeller control 16 indicative of low/negative engine torque. In response to the signal, the propeller control 16 commands an increase in blade angle so as to increase engine torque. If increasing the blade angle fails to sufficiently increase the engine torque, the plunger 53 opens the negative torque valve 50 and drains hydraulic pressure $P_{PROT}$ from the metered pressure side of protection valve 24 via line $L_6$, to rapidly command blade angle to the feather position, similar to the mechanical feather solenoid 26 as described hereinbefore. Opening of the negative torque valve 50 thereby increases the blade angle by porting $P_{PROT}$ of the protection valve 24 to ambient sump pressure ($P_O$).

The disarm valve 52 is disposed in series with negative torque valve 50 to selectively disable the negative torque valve. The disarm valve 52 is actuated by a cam 54 interconnected to a control lever 58 by a rod 60. The control lever is operated by the pilot to override or disable the negative torque valve during propeller ground handling and reversing. When the control lever 58 is pivoted to disable the negative torque valve 50, the disarm valve 52 closes, thus preventing the pressure $P_{PROT}$ from draining via the negative torque valve.

Another backup device is the mechanical feather valve 34, which functions similarly to negative torque valve 50. The feather valve 34 is actuated by cam 68 interconnected to control lever 58 by rod 60. When the control lever is pivoted to a predetermined position, the mechanical feather valve 34 opens and drains hydraulic pressure $P_{PROT}$ from the metered pressure side of protection valve 24 via line $L_8$, to rapidly command blade angle to the feather position, similar to the mechanical feather solenoid 26 as described hereinbefore. Opening of the feather valve 34 thereby increases the blade angle by porting $P_{PROT}$ of the protection valve 24 to ambient sump pressure ($P_O$).

The 54460 and 54H60 propeller systems use decrease pitch oil pressure $P_F$ as release pressure for the low pitch protection latches (not shown) as well as the feather latches (not shown) used to keep the propeller in feather when oil pressure is not present. The actuation and retraction of these latches during low pitch conditions is controlled by the low pitch and feather latch retardation system 28. The retardation system is interconnected to the low pitch side ($P_F$) at control line $L_4$ and the high pitch side ($P_C$) at control line $L_3$ through selector valve 96. The selector valve 96 provides the highest pressure between control line $L_4$ and control line $L_3$ to line $L_9$ and the latch retardation system 28.

The retardation system 28 includes a feather latch retract solenoid 90 in fluid communication with line $L_9$ for porting the oil during normal operation, and a low pitch retract valve 92 connected in fluid communication between line $L_9$ and the latch retract solenoid 90. The retract valve 92 is actuated by a cam 94 interconnected to the control lever 58 by rod 60. The retract valve 92 is shown in the open position to permit fluid flow therethrough when the control lever 58 is position as shown in the FIGURE.

In normal operation of the retardation system, the retract valve 92 is open and the retract solenoid 90 is retracted to permit oil to bleed or port from line $L_9$ and thereby prevent pressure $P_F$ from building in line $L_4$. Whenever the power lever is position below flight idle (typically during ground operations), control lever 58 pivots and cam 94 closes the retract valve 92 to allow the build up of pressure $P_F$ in line $L_4$ and thereby release the low pitch stop latches. In order to release the feather latches, the latch retract solenoid 90 must be retracted.

Whenever the control lever 58 is moved from the FEATHER (as shown in the FIGURE) to the AIR START position, the propeller control 16 provides a signal 110 to actuate the retract solenoid 90 and close line $L_9$ to build up of pressure $P_F$ in line $L_4$ and thereby release the feather latches and permit adjustment of the blades 12. The propeller control 16 maintains the retract solenoid 90 closed until blade angle measurement shows that the feather latches have in fact been released, at which time the propeller control 16 retracts the retract solenoid 90.

A rotationally variable differential transformer 74 is connected to one end of rod 60 interconnecting the control lever 58 with cams 54, 68, 94. The differential transformer measures the angular position of the control lever 58 and provides a signal to the propeller control 16 via leads 99 representative of the positions of the control lever 58 and cams. This signal enables the propeller control 16 make all of the calculations required for blade angle control and low pitch protection and ensures a correlation between control calibration and the electronic measurements made by the propeller control 16.

Additional elements of the system include main pump 76, preferably in the form of a positive displacement gear type pump readily available in the art, which functions to provide hydraulic power required for normal pitch change operation to the pitch change actuator 39, as is known in the art. A main and scavenge auxiliary motor and pump 78 operates in parallel with the main pump 76 as is known in the art. Standby pump 80 is also provided for backing up the main pump 76 and the main and scavenge pump 78 in case of failure thereof. The standby pump 80 preferably includes several check valves 82 for preventing back flow from portion 18 or main pump 76 and also a pressure relief 84 for preventing the generation of hydraulic pressure in excess of the pump capacity. A main filter 86 and a standby filter 88 are provided for each respective supply line. Each respective filter 86, 88 has a bypass valve 87, 89 to provide relief in the event of a clogged filter. A regulating valve 81 regulates the hydraulic supply pressure to the propeller control system 10.

Further, a blade angle feedback system 36 based on the use of magnetic pulse pickups 44 is utilized. This system allows for high reliability acquisition of the propeller blade angle, which is required for ground and reversing operations as well as low pitch protection during flight. A stationary magnetic pickup 44 senses a reference pulse and a subsequent blade angle pulse from the rotating hub assembly. The reference pulse is generated by a double magnetic pole fixed to the hub and passing by the magnetic pickup. The blade angle pulse is generated by a single magnetic pole fixed to the propeller blade 12 and rotating with the blade 12 through any blade angle changes. The arc length between the two magnetic poles as measured from the rotating hub shaft changes as the blade 12 rotates, thus changing the time period between the two sensed pulses. If the propeller assembly is rotating at a relatively constant rate, then the blade pitch angle can be determined accurately.

In operation, electronic control 16 is the primary system for controlling blade angle of blades 12 by commanding electro-hydraulic valve 20 to direct hydraulic pressure $P_C$, $P_F$ through lines $L_1$ and $L_2$ to an oil transfer interface 38 and blade pitch actuator. Accordingly, under normal operation, protection servo valve 24 is preferably aligned for flow therethrough of hydraulic pressure from valve 20, through lines $L_1$ and $L_2$. In this manner, a transfer bearing transmits the coarse and fine pitch hydraulic pressure $P_C$, $P_F$ from electro-hydraulic flow valve 20. During normal usage, the blade angle feedback sensing system 36, discussed above, provides continual information to the electronic control 16, constantly updating the blade angle of blades 12.

As described hereinbefore, a feather solenoid 26 may be manually invoked for emergency feather, thereby overriding control 16 and electro-hydraulic valve 20. Accordingly, with the malfunction of control 16 and other conditions which may require the propeller to go to feather, control 16 is manually overridden by the pilot via feather solenoid 26 to change the blade angles of blades 12 in the full coarse direction to feather. In this scenario, protection valve 24 is again moved to the protective position whereby flow from servo valve 20 is cut off, thereby cutting off propeller control 16. Hydraulic pressure $P_{PROT}$ is drained from the protection valve 24 through line $L_7$ and supply pressure $P_S$ is ported to line $L_3$ to the coarse side of the actuator piston for allowing rapid high pitch adjustment. When feather solenoid 26 is relieved of control, control 16 will begin an unfeathering sequence during which the system will limit blade pitch angle decrease until the RPM of the blades nears the selected governing RPM.

Similarly, the mechanical feather valve 34 and the negative torque valve function similar to the feather solenoid 26 to invoke emergency feather should the propeller control 16 malfunction.

The propeller maintenance interface panel 19 is provided for aircraft personnel to allow for calibration, fault interrogation, and real-time data display of critical propeller system parameters. A first rotary switch 101 is used to select which one of the propeller control 16 (one for each propeller on the aircraft) the interface panel 19 is in communication with. A second rotary switch 102 is used to select between Fault Data, $\beta_{TRIM}$, $\beta$, $N_P$, CL, and $CL_{TRIM}$ switch positions. The Fault Data switch position selects fault data to be transmitted from the selected propeller (propeller control 16) for display on an LED display 103 or capture via a PC connected to the UART port.

The four digit LED display 103 is mounted on the front panel for data read out. A single throw switch 106 is provided to set the mode of the interface panel in a Normal mode or a Program mode. A UART port 105 is mounted on the front panel for communications with an external device. The interface panel 19 also serves as a link between the existing propeller synchrophasing control system in the aircraft cockpit and the nacelle mounted propeller control computers. Other than basic switches and straight-through electrical connections, the interface panel 19 also includes an ARINC-429 reader which allows for display of information selected by the second rotary switch 102 and generated by the propeller controls 16 installed on the aircraft.

A program (Boot & Comm) signal line provided to the propeller control 16 by interface panel 19 enables the propeller control 16 to be programmed by an external device. In one embodiment a personal computer (PC) is connected to the UART port on the interface panel so as to download a new program into the propeller control 16. The program signal line allows the interface panel 19 to toggle a write protect state in the propeller control 16. The switch is set to the Program position.

There is one interface panel 19 installed in each aircraft and one control panel 16 installed for each propeller on the aircraft. The interface panel 19 has a separate interface to each installed propeller control 16. A trim/erase push button 104 is used for calibrating the propeller control 16.

The primary advantage of this invention is that an improved electronic propeller control system 10 is provided having a simplified backup system for monitoring, controlling and changing the propeller blade angles. Another advantage of this invention is that an electronic propeller control system is provided with a backup system for use with pitch lock type propeller blades wherein the system includes a single simplified protection valve 24 which is operative to control various backup system features. Still another advantage of this invention that an electronic propeller control system 10 is that having a backup system wherein the control system in the form of a lighter and lower cost hydro-mechanical unit 25. And yet another advantage of this invention is that an electronic propeller control system 10 is provided having a backup system wherein the control system includes means for automatically checking the functionality of the backup system.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A system for controlling the blade angle of a plurality of blades of a propeller, said system comprising:
   an actuator for adjusting the blade angle of the plurality of blades in response to hydraulic pressure;
   a servo valve disposed in selective fluid communication with said actuator, said servo valve providing hydraulic pressure to said actuator in response to a control signal;
   an electronic control providing the control signal to actuate said servo valve in response to a plurality of input signals;
   a protection valve disposed in fluid communication with and intermediate said servo valve and said actuator, said protection valve selectively providing fluid communication between said servo valve and said actuator in response to a protect pressure; and
   a backup device in fluid communication with said protection valve, said backup device providing a protect pressure to actuate said protection valve in response to a predetermined condition;
   wherein said backup device includes a low pitch retardation system having a solenoid for releasing a feather latch in response to a retract signal provided by said electronic control.

2. The system according to claim 1, wherein said predetermined condition includes at least one of testing, manual override and a malfunction of said electronic control.

3. The system according to claim 1, wherein said backup device includes a feather actuator for providing a protect pressure to actuate said protection valve to rotate the plurality of blades to a feathered position.

4. The system according to claim 3, wherein said feather actuator comprises a feather solenoid, and wherein said electronic control provides a signal to enable said feather solenoid in response to the predetermined condition.

5. The system according to claim 1, wherein said backup device includes a feather valve for providing a protect pressure to actuate said protection valve to rotate the plurality of blades to a feathered position.

6. The system according to claim 5, wherein said backup device further includes a lever assembly for actuating said feather valve in response to the predetermined condition.

7. The system according to claim 6, wherein said backup device further includes a transducer that provides a position signal to said electronic control indicative of the position of the lever assembly.

8. The system according to claim 7, wherein said transducer is a rotationally variable differential transformer.

9. The system according to claim 1, wherein said backup device includes a negative torque valve for providing a protect pressure to actuate said protection valve to rotate the plurality of blades feathered position.

10. The system according to claim 9, wherein said negative torque valve includes a plunger that actuates the torque valve in response to a negative torque fault condition.

11. The system according to claim 10, wherein said backup device includes a proximate switch that provides a signal to the electronic control indicative of the position of the plunger.

12. The system according to claim 11, wherein said backup device further includes a disarm valve disposed in fluid communication and intermediate the negative torque valve and said protection valve to disable the function of the negative torque valve.

13. The system according to claim 12, wherein said backup device further includes a lever assembly for actuating said feather valve in response to the predetermined condition.

14. The system according to claim 13, wherein said backup device further includes a transducer that provides a position signal to said electronic control indicative of the position of the lever assembly.

15. The system according to claim 14, wherein said transducer is a rotationally variable differential transformer.

16. The system according to claim 1, wherein said retardation system further includes a retract valve disposed in fluid communication and intermediate said actuator and said solenoid for providing a release pressure to release a low pitch protection latch.

17. The system according to claim 16, wherein said retardation system further includes a lever assembly for actuating said retract valve in response to the predetermined condition.

18. The system according to claim 1, wherein said system further comprises an interface unit in communication with said electronic control to display selected data of a propeller system.

19. The system according to claim 1, wherein said system further comprises an interface unit in communication with said electronic control to program the electronic control.

20. A system for controlling the blade angle of a plurality of blades of a propeller, said system comprising:

an actuator for adjusting the blade angle of the plurality of blades in response to hydraulic pressure;

a servo valve disposed in selective fluid communication with said actuator, said servo valve providing hydraulic pressure to said actuator in response to a control signal;

an electronic control providing the control signal to actuate said servo valve in response to a plurality of input signals;

a protection valve disposed in fluid communication with and intermediate said servo valve and said actuator, said protection valve selectively providing fluid communication between said servo valve and said actuator in response to a protect pressure; and a backup device in fluid communication with said protection valve, said backup device providing a protect pressure to actuate said protection valve in response to a predetermined condition;

wherein said backup device includes a feather valve for providing a protect pressure to actuate said protection valve to rotate the plurality of blades to a feathered position, and wherein said backup device further includes a lever assembly for actuating said feather valve in response to the predetermined condition.

21. The system according to claim 20, wherein said backup device further includes a transducer that provides a position signal to said electronic control indicative of the position of the lever assembly.

22. The system according to claim 21, wherein said transducer is a rotationally variable differential transformer.

23. A system for controlling the blade angle of a plurality of blades of a propeller, said system comprising:

an actuator for adjusting the blade angle of the plurality of blades in response to hydraulic pressure;

a servo valve disposed in selective fluid communication with said actuator, said servo valve providing hydraulic pressure to said actuator in response to a control signal;

an electronic control providing the control signal to actuate said servo valve in response to a plurality of input signals;

a protection valve disposed in fluid communication with and intermediate said servo valve and said actuator, said protection valve selectively providing fluid communication between said servo valve and said actuator in response to a protect pressure; and a backup device in fluid communication with said protection valve, said backup device providing a protect pressure to actuate said protection valve in response to a predetermined condition;

wherein said backup device includes a negative torque valve for providing a protect pressure to actuate said protection valve to rotate the plurality of blades to a feathered position;

wherein said negative torque valve includes a plunger that actuates the torque valve in response to a negative torque fault condition;

wherein said backup device includes a proximate switch that provides a signal to the electronic control indicative of the position of the plunger; and wherein said backup device further includes a disarm valve disposed in fluid communication and intermediate the negative torque valve and said protection valve to disable the function of the negative torque valve.

24. The system according to claim 23, wherein said backup device further includes a lever assembly for actuating said feather valve in response to the predetermined condition.

* * * * *